US006850903B2

(12) United States Patent
Levine

(10) Patent No.: US 6,850,903 B2
(45) Date of Patent: Feb. 1, 2005

(54) METHOD AND SYSTEM FOR CUSTOMIZING A DISTRIBUTION NETWORK BASED ON MARKET CONDITIONS

(75) Inventor: Robert Levine, Bedford, NY (US)

(73) Assignee: Fooddirect, Inc., Bronx, NY (US)

( * ) Notice: Subject to any disclaimer, the term of this patent is extended or adjusted under 35 U.S.C. 154(b) by 0 days.

(21) Appl. No.: 10/208,691

(22) Filed: Jul. 29, 2002

(65) Prior Publication Data
US 2003/0040978 A1 Feb. 27, 2003

Related U.S. Application Data

(62) Division of application No. 09/711,987, filed on Nov. 14, 2000.

(51) Int. Cl.[7] .............................................. G06F 17/60
(52) U.S. Cl. ......................................... 705/28; 705/400
(58) Field of Search ............................... 705/10, 14, 15

(56) References Cited

U.S. PATENT DOCUMENTS

| | | | | |
|---|---|---|---|---|
| 5,822,736 A | * | 10/1998 | Hartman et al. | ............... 705/14 |
| 5,987,425 A | * | 11/1999 | Hartman et al. | ............... 705/14 |
| 6,038,554 A | * | 3/2000 | Vig | ............... 705/400 |
| 2002/0016779 A1 | * | 2/2002 | Roll et al. | .................. 705/400 |
| 2002/0059058 A1 | * | 5/2002 | Doolin et al. | ................. 705/10 |
| 2002/0107818 A1 | * | 8/2002 | McEwen et al. | ............ 705/400 |
| 2002/0116348 A1 | * | 8/2002 | Phillips et al. | ............... 705/400 |

FOREIGN PATENT DOCUMENTS

WO    WO 00/67104 A1 * 11/2000

OTHER PUBLICATIONS

Saxton, Lisa "How Not to be Cowed by Wholesalers" Mar. 9,1992, Supermarket News, p. 28.*
"Industry Briefs: Trade'ex Certified by Java" Aug. 4, 1997, Electronic Commerce News, v2, n31.*
"Aiming For The Right Price" Jan. 1997, Do–It–Yourself Retailing Price p. 47.*
Lehman Brothers, Inc. "Health Care Distribution & Technology" Apr. 2001, Industry Report.*
Liddle, Alan J, "New dot–com company offers technology aids to indies" Nov. 2000, Nation's Restaurant News, v34n45 pp:22, 118.*
Carbone, James, "E–commerce for trading partners" Dec. 1999, Purchasing, v127n9 PP: S37–S39.*

* cited by examiner

Primary Examiner—Lynda Jasmin
(74) Attorney, Agent, or Firm—Morgan & Finnegan LLP

(57) ABSTRACT

A method for pricing a product by a wholesaler. The method comprises providing a master database of product information to a distributor, receiving a selection of products from the distributor, wherein the distributor chooses the selection from the master database and provides a variable margin amount for the products to the wholesaler. The wholesaler associates a customer category with the variable margin amounts, and then assigns the customer category to one of the products. Finally, the wholesaler calculates a variable price for the products, based on provided variable margin amount and transmits the calculated variable price for the products to the distributor.

12 Claims, 23 Drawing Sheets

FIG. 11A

Distributor Admin Menu 1100

DISTRIBUTORS #1 1103
2 NEWBOLD AVE. BRONX, N.Y. 10461 (718) 111-3333  1 1 05

*You are in On-Line Mode and can access the following functions.*
*Distributor Specific Information, adding, deleting. etc. is managed on the 'Special' 36*

Rollover Status 1107

11/03/2000 9:44:23 AM Rollover/Merge Compilation Successful!

Sales Sheet 1110
This Week - based on last distributor rollover
- View This Weeks Pricing 1120
- View This Weeks Customer Sales Sheet 1130

Next Week
- Edit Next Weeks Pricing 1140
- Edit Next Weeks Customer Categories 1150

Customer Information
Create a New Customer
New customers will not be active until the next distributor rollover.
Browse Customers (including pending)

Beer Sheet 1115
This Week - based on last distributor rollover
- View This Weeks Pricing 1160
- View This Weeks Customer Beer Sheet 1170
By Category 1171
A B C 1173
Next Week
- Edit Next Weeks Pricing 1180
- Edit Next Weeks Customer Category 1190

Download Web Data for Offline Usage
Download the Distributor Magic Printing Application
Get the Wholesaler Product Database
In the above process you will be prompted for a directory and file name to save the downloaded file. In order to be used for a laptop web site, You must save the downloaded file in the directory named \inetpub\wwwroot\fd\fddata\
And name the file FD.MDB
Get This Weeks Price and Customer Info
In the above process you will be prompted for a directory and file name to save the downloaded file. In order to be used for a laptop web site, you must save the downloaded file in the directory named \inetpub\wwwroot\fd\offline\
And name the file distributor.mdb

Upload to Distributor Web Page
Upload a file for your Web Page

[            ]
[ Upload ]

View your Web Page
View your Web Directory Contents

FIG. 11B

THIS WEEKS SALES SHEET ADJUSTMENTS
DISTRIBUTOR #1

| Next Weeks Sales Product 1121 | Sales Force Price 1122 | Default Margin 1123 | A Margin 1124 | B Margin 1125 | C Margin 1126 |
|---|---|---|---|---|---|
| FRESH HANGING NATURED LEG OF VEAL | $3.25 | $0.30 | $0.20 | $0.30 | $0.40 |
| CATELLI NATURED BHS VEAL | $5.05 | $0.40 | $0.20 | $0.40 | $0.50 |
| FRESH GROUND BEEF 80/20 POLY OR VAC. BAGS | $1.66 | $0.47 | $0.14 | $0.34 | $0.44 |
| CATELLI NATURED CAP OFF TOP ROUND 3PC | $9.45 | $0.70 | $0.50 | $0.70 | $0.80 |
| CATELLI NATURED TRIMMED LOIN OF VEAL 2PC | $5.55 | $0.50 | $0.30 | $0.50 | $0.60 |
| CATELLI NATURED CALEANED TBS VEAL | $6.80 | $0.50 | $0.30 | $0.50 | $0.60 |
| CATELLI NATURED CALVE LIVER 2PC | $2.40 | $0.35 | $0.25 | $0.35 | $0.45 |
| LUNDY FRESH PORK LOINS 12/16 5PC | $1.53 | $0.15 | $0.10 | $0.15 | $0.25 |
| CATELLI NATURED HIND SHANKS OF VEAL 2/PKG | $3.95 | $0.40 | $0.30 | $0.40 | $0.50 |
| LUNDY FRESH PORK BUTTS 55LB | $0.97 | $0.15 | $0.10 | $0.15 | $0.20 |
| CATELLI NATURED BREAST OF VEAL 4PC | $1.02 | $0.15 | $0.15 | $0.15 | $0.20 |
| LUNDY & MBPXL CENTERCUT BNLS PORK LOINS | $2.20 | $0.25 | $0.14 | $0.24 | $0.34 |
| GRADE A TENDER OUT CHICKEN CUTLET 4/10LB | $1.55 | $0.30 | $0.10 | $0.25 | $0.35 |
| FARMER PRIDE CHICKEN LEGS 40LB | $0.42 | $0.12 | $0.10 | $0.15 | $0.20 |

FIG. 11C1

<div style="text-align:center">
WEEKLY SPECIALS<br>
CUSTOMER #1  -1131<br>
DISTRIBUTOR #1<br>
<u>Print Out This Sheet</u>
</div>

PRICE ARE BASED ON FULL CASE ONLY

| | |
|---|---|
| <u>FRESH HANGING NATURED LEG OF VEAL</u> | $3.15 ☐ |
| <u>FRESH GROUND BEEF 80/20 POLY OR VAC. BAGS</u> | $1.35 ☐ |
| <u>TOP ROUND TRIMMED & TIED DELI STYLE VAC.</u> | $2.44 ☐ |

↘ 1132

PORK PRODUCTS ON SALE NON-TUES

| | |
|---|---|
| <u>LUNDY FRESH PORK LOINS 12/16 5PC</u> | $1.48 ☐ |
| <u>LUNDY FRESH PORK BUTTS 55LB</u> | $0.92 ☐ |
| <u>LUNDY & MBPXL CENTERCUT BNLS PORK LOINS</u> | $2.09 ☐ |

POULTRY PRICES ON SALE MOM-TUES

| | |
|---|---|
| <u>GRADE A TENDER OUT CHICKEN CUTLET 4/10LB</u> | $1.35 ☐ |
| <u>FARMER PRIDE CHICKEN LEGS 40LB</u> | $0.50 ☐ |
| <u>WAMPLER GRADE A LEGS 40LB</u> | $0.49 ☐ |
| <u>WAMPLER QUARTER LEGS 40LB</u> | $0.37 ☐ |
| <u>GRADE A CHICKEN WING 40LB</u> | $0.89 ☐ |
| <u>FRESH JUMBO GRADE A WING</u> | $0.99 ☐ |
| <u>FRESH (B) WINGS</u> | $0.48 ☐ |
| <u>GRADE A FRESH PARTY WINGS 40LB</u> | $1.05 ☐ |
| <u>GRANDE A CHICKEN BREAST 40LB</u> | $0.87 ☐ |
| <u>GRADE A BONELESS THIGHS 40LB</u> | $1.00 ☐ |

FIG. 11C2

WEEKLY SPECIALS
CUSTOMER #1  -1131
DISTRIBUTOR #1
Print Out This Sheet

10/30/00 TO 11/03/00 1133

| | |
|---|---|
| CATELLI NATURED BHS VEAL | $5.05 ☐ |
| CATELLI NATURED CAP OFF TOP ROUNDS 3 PC | $9.55 ☐ |
| CATELLI NATURED TRIMMED LOIN VEAL 2PC | $5.35 ☐ |
| CATELLI NATURED CLEANED TBS VEAL | $6.80 ☐ |
| CATELLI NATURED CALVE LIVER 2PC | $2.30 ☐ |
| CATELLI NATURED HIND SHANKS OF VEAL 2/PKG | $4.05 |
| CATELLI NATURED BREAST OF VEAL 4PC | $1.02 ☐ |
| NAPKIN 3 PLY DINNER P7381 GP 2000CT | $40.65 ☐ |
| NAPKIN 2 PLY DINNER 15X17 3000 | $27.45 ☐ |
| NAPKIN DISP LOFOLD #1940/6311 8000PK | $19.75 ☐ |
| NAPKINS HYNAPS #D6110 TALLNAPS 8000CT | $24.15 ☐ |
| NAPKINS COCKTAIL BEVERAGE 4000 | $12.05☐ |
| WETNAPS 1000CT | $10.50 ☐ |
| PAPER TOWELS 30 ROLLS | $17.19 ☐ |
| C FOLD PAPER TOWEL 2400CT | $12.38 ☐ |
| PAPER TOWELS NATURAL 12 ROLLS 8" | $17.55 ☐ |
| PREMIUM LABEL #1 BOILED HAM PEAR SHAPE | $2.19 ☐ |
| PREMIUM LABEL BONELESS SMOKED BUFFET HAM 2PC | $1.29 ☐ |
| TOILET PAPER 300 2PLY 96PK | $26.32 ☐ |

THIS WEEKS SALES SHEET ADJUSTMENTS
DISTRIBUTOR #1
*Entering –1 will automatically use the default margin.*
*These prices are based on full cases.*

| Next Weeks Sales Product 1141 | Sales Force Price 1142 | Default Margin 1143 | A Margin 1144 | B Margin 1145 | C Margin 1146 |
|---|---|---|---|---|---|
| FRESH HANGING NATURED LEG OF VEAL | $3.25 | $0.30 | $0.20 | $0.30 | $0.40 |
| CATELLI NATURED BHS VEAL | $5.05 | $0.40 | $0.20 | $0.40 | $0.50 |
| FRESH GROUND BEEF 80/20 POLY OR VAC. BAGS | $1.66 | $0.47 | $0.14 | $0.34 | $0.44 |
| CATELLI NATURED CAP OFF TOP ROUNDS 3 PC | $9.45 | $0.70 | $0.50 | $0.70 | $0.80 |
| CATELLI NATURED TRIMMED LOIN OF VEAL 2PC | $5.55 | $0.50 | $0.30 | $0.50 | $0.60 |
| CATELLI NATURED CLEANED TBS VEAL | $6.80 | $0.50 | $0.30 | $0.50 | $0.60 |
| CATELLI NATURED CALVE LIVER 2PC | $2.40 | $0.35 | $0.25 | $0.35 | $0.45 |
| LUNDY FRESH PORK LOINS 12/16 5PC | $1.53 | $0.15 | $0.10 | $0.15 | $0.25 |
| CATELLI NATURED HIND SHANKS OF VEAL 2/PKG | $3.95 | $0.40 | $0.30 | $0.40 | $0.50 |
| LUNDY FRESH PORK BUTTS 55LB | $0.97 | $0.15 | $0.10 | $0.15 | $0.20 |
| CATELLI NATURED BREAST OF VEAL 4PC | $1.02 | $0.15 | $0.15 | $0.15 | $0.20 |
| LUNDY & MBPXL CENTERCUT BNLS PORK LOINS | $2.20 | $0.25 | $0.14 | $0.24 | $0.34 |
| GRADE A TENDER OUT CHICKEN CUTLET 4/10LB | $1.55 | $0.30 | $0.10 | $0.25 | $0.35 |

FIG. 11D2

THIS WEEKS SALES SHEET ADJUSTMENTS
DISTRIBUTOR #1
*Entering –1 will automatically use the default margin.*
These prices are based on full cases.

| Next Weeks Sales Product 1141 | Sales Force Price 1142 | Default Margin 1143 | A Margin 1144 | B Margin 1145 | C Margin 1146 |
|---|---|---|---|---|---|
| FARMER PRIDE CHICKEN LEGS 40LB | $0.42 | $0.12 | $0.10 | $0.15 | $0.20 |
| WAMPLER QUARTER LEGS 40LB | $0.37 | $0.10 | $0.10 | $0.10 | $0.15 |
| GRADE A FRESH PARTY WINGS 40LB | $1.15 | $0.20 | $0.10 | $0.15 | $0.20 |
| GRADE A FRESH JUMBO PARTY WINGS 40LB | $1.27 | $0.20 | $0.10 | $0.15 | $0.20 |

Accept Information 1147

FIG. 11E1

NEXT WEEKS SALES SHEET CATEGORIES
CUSTOMER #1
*These prices are based on full cases.*
*Enter D to use the default sales force price.*

| Next Weeks Sales Product 1151 | Sales Force Price 1152 | Default Margin 1153 | A Margin 1154 | B Margin 1155 | C Margin 1156 | Customer Category 1157 |
|---|---|---|---|---|---|---|
| FRESH HANGING NATURED LEG OF VEAL | $3.25 | $0.30 | $0.20 | $0.30 | $0.40 | A |
| CATELLI NATURED BHS VEAL | $5.05 | $0.40 | $0.20 | $0.40 | $0.50 | B |
| FRESH GROUND BEEF 80/20 POLY OR VAC. BAGS | $1.66 | $0.47 | $0.14 | $0.34 | $0.44 | A |
| CATELLI NATURED CAP OFF TOP ROUND 3PC | $9.45 | $0.70 | $0.50 | $0.70 | $0.80 | C |
| CATELLI NATURED TRIMMED LOIN OF VEAL 2PC | $5.55 | $0.50 | $0.30 | $0.50 | $0.60 | A |
| CATELLI NATURED CLEANED TBS VEAL | $6.80 | $0.50 | $0.30 | $0.50 | $0.60 | D |
| CATELLI NATURED CALVE LIVER 2PC | $2.40 | $0.35 | $0.25 | $0.35 | $0.45 | A |
| LUNDY FRESH PORK LOINS 12/16 5PC | $1.53 | $0.15 | $0.10 | $0.15 | $0.25 | A |
| CATELLI NATURED HIND SHANKS OF VEAL 2/PKG | $3.95 | $0.40 | $0.30 | $0.40 | $0.50 | C |
| LUNDY FRESH PORK BUTTS 55LB | $0.97 | $0.15 | $0.10 | $0.15 | $0.20 | A |
| CATELLI NATURED BREAST OF VEAL 4PC | $1.02 | $0.15 | $0.15 | $0.15 | $0.20 | B |
| LUNDY & MBPXL CENTERCUT BNLS PORK LOINS | $2.20 | $0.25 | $0.14 | $0.24 | $0.34 | A |

FIG. 11E2

NEXT WEEKS SALES SHEET CATEGORIES
CUSTOMER #1
*These prices are based on full cases.*
*Enter D to use the default sales force price.*

| Next Weeks Sales Product 1151 | Sales Force Price 1152 | Default Margin 1153 | A Margin 1154 | B Margin 1155 | C Margin 1156 | Customer Category 1157 |
|---|---|---|---|---|---|---|
| GRADE A TENDER OUT CHICKEN CUTLET 4/10LB | $1.55 | $0.30 | $0.10 | $0.25 | $0.35 | A |
| FARMER PRIDE CHICKEN LEGS 40LB | $0.42 | $0.12 | $0.10 | $0.15 | $0.20 | C |
| WAMPLER QUARTER LEGS 40LB | $0.37 | $0.10 | $0.10 | $0.10 | $0.15 | A |
| GRADE A FRESH PARTY | $1.15 | $0.20 | $0.10 | $0.15 | $20 | A |

Accept Information 1147

FIG. 11F

NEXT WEEKS BEEF SHEET ADJUSTMENTS
DISTRIBUTOR #1
Entering –1 will automatically use the default margin
(Salesforce Price less Foodirect Price.)

These prices are based on full cases.

| Product Price Range 1181 | Default Margin 1183 | A 1185 | B 1186 | C 1187 |
|---|---|---|---|---|
| $0.01-$0.50 | $0.13 | $0.05 | $0.05 | $0.10 |
| $0.51-$1.00 | $0.16 | $0.10 | $0.12 | $0.15 |
| $1.01-$1.50 | $0.19 | $0.10 | $0.15 | $0.20 |
| $1.51-$2.00 | $0.22 | $0.12 | $0.20 | $0.25 |
| $2.01-$2.50 | $0.25 | $0.13 | $0.23 | $0.25 |
| $2.51-$3.00 | $0.28 | $0.13 | $0.23 | $0.29 |
| $3.01-$3.50 | $0.31 | $0.15 | $0.25 | $0.35 |
| $3.51-$4.00 | $0.34 | $0.16 | $0.26 | $0.38 |
| $4.01-$4.50 | $0.37 | $0.18 | $0.27 | $0.41 |
| $4.51-$5.00 | $0.40 | $0.19 | $0.29 | $0.45 |
| $5.01-$5.50 | $0.43 | $0.43 | $0.30 | $0.48 |
| $5.51-$6.00 | $0.46 | $0.22 | $0.32 | $0.50 |
| $6.01-$6.50 | $0.49 | $0.25 | $0.35 | $0.55 |
| $6.51-$7.00 | $0.52 | $0.30 | $0.38 | $0.58 |
| $7.01-$7.50 | $0.55 | $0.32 | $0.40 | $0.65 |
| $7.51-$8.00 | $0.58 | $0.35 | $0.43 | $0.68 |
| $8.01-$8.50 | $0.61 | $0.38 | $0.47 | $0.75 |
| $8.51-$9.00 | $0.64 | $0.41 | $0.55 | $0.80 |
| $9.01-$9.50 | $0.67 | $0.43 | $0.60 | $0.85 |

FIG. 11G

BEEF PRICES
CUSTOMER #1
DISTRIBUTOR #1
Print Out This Sheet

All prices are based on availability and subject to change on Wednesday. These prices are based on full cases
Day of 10/31/2000  1173

| BEEF PRODUCT 1172 | NATIONAL | XL | IPB | MONFONT | BLACK ANGUS |
|---|---|---|---|---|---|
| 1. Prime Top Round | $1.60 ☐ | 1175 | | | |
| 2. Denuded Top Round 2pc | | | | | |
| 3. Choice Top Round ¼ TR | $1.46 ☐ | | | $1.44 ☐ | |
| 4. Choice Top Round | | | | $1.44 ☐ | |
| 5. Select Top Round | | | | $1.55 ☐ | |
| 6. Select Top Round ¼ | $1.96 ☐ | | | | |
| 7. Choice Eye Round | 1179 | | | $1.69 ☐ | |
| 8. Choice Gooseneck | | | $1.35 ☐ | | |
| 9. Choice Bottom Flat | | | | | |
| 10. Select Semi Bnls Chuck | | | $1.24 ☐ | | |
| 11. Select 2pc Chuck | $1.27 ☐ | | $1.28 ☐ | | |
| 12. Choice Shoulder Clod | | | $1.51 ☐ | | |
| 13. Choice Chuck Rolls | | | | | |
| 14. 1x1 Boneless Shell 3pc | | | $4.58 ☐ | | |
| 15. 0x1 Choice Bnls Shell | | | $3.32 ☐ | | |
| 16. Choice Boneless Shell | | | | | |
| 17. Select Boneless Shell | $2.22 ☐ | | | | |
| 18. Choice Bone-In Shell | $2.92 ☐ | | | | |
| 19. Flank Steak | $2.60 ☐ | | | | |
| 20. Skirt Steak | $2.11 ☐ | | | | |

FIG. 11H

BEEF PRICES
Customer Category – B 1178
DISTRIBUTOR #1
Print Out This Sheet

All prices are based on availability and subject to change on Wednesday. These prices are based on full cases
Day of 10/31/2000

| BEEF PRODUCT 1172 | NATIONAL | XL | IPB | MONFONT | BLACK ANGUS |
|---|---|---|---|---|---|
| 1. Prime Top Round | $1.65 ☐ | | | | |
| 2. Denuded Top Round 2pc | | | | | |
| 3. Choice Top Round ¼ TR | $1.46 ☐ | 1175 | | | |
| 4. Choice Top Round | 1179 | | | | |
| 5. Select Top Round | | | | $1.49 ☐ | |
| 6. Select Top Round ¼ | $2.04 ☐ | | | $1.49 ☐ | |
| 7. Choice Eye Round | | | $1.40 ☐ | $1.60 ☐ | |
| 8. Choice Gooseneck | | | | | |
| 9. Choice Bottom Flat | | | | $1.77 ☐ | |
| 10. Select Semi Bnls Chuck | | | $1.29 ☐ | | |
| 11. Select 2pc Chuck | $1.32 ☐ | | $1.33 ☐ | ☐ | |
| 12. Choice Shoulder Clod | | | $1.56 ☐ | | |
| 13. Choice Chuck Rolls | | | | | |
| 14. 1x1 Boneless Shell 3pc | | | $4.67 ☐ | | |
| 15. 0x1 Choice Bnls Shell | | | $3.42 ☐ | | |
| 16. Choice Boneless Shell | | | | | |
| 17. Select Boneless Shell | $2.32 ☐ | | | | |
| 18. Choice Bone-In Shell | $3.02 ☐ | | | | |
| 19. Flank Steak | $2.70 ☐ | | | | |
| 20. Skirt Steak | $2.19 ☐ | | | | |

FIG. 11I

**NEXT WEEKS BEEF SHEET ADJUSTMENTS
DISTRIBUTOR #1**
Entering –1 will automatically use the default margin
(Salesforce Price less Foodirect Price.)

These prices are based on full cases.

| Product Price Range 1181 | Default Margin 1183 | A 1185 | B 1186 | C 1187 |
|---|---|---|---|---|
| $0.01-$0.50 | $0.13 | $0.05 | $0.05 | $0.10 |
| $0.51-$1.00 | $0.16 | $0.10 | $0.12 | $0.15 |
| $1.01-$1.50 | $0.19 | $0.10 | $0.15 | $0.20 |
| $1.51-$2.00 | $0.22 | $0.12 | $0.20 | $0.25 |
| $2.01-$2.50 | $0.25 | $0.13 | $0.23 | $0.25 |
| $2.51-$3.00 | $0.28 | $0.13 | $0.23 | $0.29 |
| $3.01-$3.50 | $0.31 | $0.15 | $0.25 | $0.35 |
| $3.51-$4.00 | $0.34 | $0.16 | $0.26 | $0.38 |
| $4.01-$4.50 | $0.37 | $0.18 | $0.27 | $0.41 |
| $4.51-$5.00 | $0.40 | $0.19 | $0.29 | $0.45 |
| $5.01-$5.50 | $0.43 | $0.43 | $0.30 | $0.48 |
| $5.51-$6.00 | $0.46 | $0.22 | $0.32 | $0.50 |
| $6.01-$6.50 | $0.49 | $0.25 | $0.35 | $0.55 |
| $6.51-$7.00 | $0.52 | $0.30 | $0.38 | $0.58 |
| $7.01-$7.50 | $0.55 | $0.32 | $0.40 | $0.65 |
| $7.51-$8.00 | $0.58 | $0.35 | $0.43 | $0.68 |
| $8.01-$8.50 | $0.61 | $0.38 | $0.47 | $0.75 |
| $8.51-$9.00 | $0.64 | $0.41 | $0.55 | $0.80 |
| $9.01-$9.50 | $0.67 | $0.43 | $0.60 | $0.85 |

Accept Information 1147

FIG 11J

EDIT CUSTOMER BEEF CATEGORY

CUSTOMER #1   | Accept 1147 |
Modify Category: A (Enter D to use the default Salesforce Price.)

These prices are based on full cases.

| Product Price Range 1191 | Default Margin 1192 | A 1193 | B 1194 | C 1195 |
|---|---|---|---|---|
| $0.01-$0.50 | $0.13 | $0.05 | $0.05 | $0.10 |
| $0.51-$1.00 | $0.16 | $0.10 | $0.12 | $0.15 |
| $1.01-$1.50 | $0.19 | $0.10 | $0.15 | $0.20 |
| $1.51-$2.00 | $0.22 | $0.12 | $0.20 | $0.25 |
| $2.01-$2.50 | $0.25 | $0.13 | $0.23 | $0.25 |
| $2.51-$3.00 | $0.28 | $0.13 | $0.23 | $0.29 |
| $3.01-$3.50 | $0.31 | $0.15 | $0.25 | $0.35 |
| $3.51-$4.00 | $0.34 | $0.16 | $0.26 | $0.38 |
| $4.01-$4.50 | $0.37 | $0.18 | $0.27 | $0.41 |
| $4.51-$5.00 | $0.40 | $0.19 | $0.29 | $0.45 |
| $5.01-$5.50 | $0.43 | $0.43 | $0.30 | $0.48 |
| $5.51-$6.00 | $0.46 | $0.22 | $0.32 | $0.50 |
| $6.01-$6.50 | $0.49 | $0.25 | $0.35 | $0.55 |
| $6.51-$7.00 | $0.52 | $0.30 | $0.38 | $0.58 |
| $7.01-$7.50 | $0.55 | $0.32 | $0.40 | $0.65 |
| $7.51-$8.00 | $0.58 | $0.35 | $0.43 | $0.68 |
| $8.01-$8.50 | $0.61 | $0.38 | $0.47 | $0.75 |
| $8.51-$9.00 | $0.64 | $0.41 | $0.55 | $0.80 |
| $9.01-$9.50 | $0.67 | $0.43 | $0.60 | $0.85 |
| $9.51-$10.00 | $0.70 | $0.45 | $0.65 | $0.95 |

METHOD AND SYSTEM FOR CUSTOMIZING A DISTRIBUTION NETWORK BASED ON MARKET CONDITIONS

This is divisional of co-pending application Ser. No. 09/711,987, filed Nov. 14, 2000.

BACKGROUND OF THE INVENTION

1. Field of the Invention

This invention relates generally to a method and system of developing a custom distribution network based on market conditions and, more particularly, to a system and method that allows users to select and track variable pricing for a variety of products using a customized distribution network that can be accessed via a network.

2. Description of Related Art

Businesses that work in the food distribution arena need to be able to maintain records regarding the high volume of transactions that take place on a daily basis. These transactions may involve tracking inventoried items, customers, prices to be charged, billing records, shipping records, and sales receipts. In the wholesale food distribution business, generally the products are purchased from a wholesaler and then sold to many different customers by a distributor. Part of the process involves obtaining the requisite items, transporting and delivering the items to customers in different locations, determining the appropriate price that the customer will pay for the desired products and adjusting prices to meet market conditions.

While some systems allow users to keep track of inventory, none of these systems enable users to set and select variable prices, track customers and allow choices of more products and prices. It is difficult to keep track of each customer and the price that each customer is willing to pay for products, since each customer may be paying different prices for the same product. In addition, since customers generally deal with distributors only, wholesalers never have the opportunity to study customer-buying habits. Furthermore, records for these types of transactions are done by pencil and paper, which are difficult to maintain for later use or for manipulating the data to study the buying habits of customers.

As a result, there is a need for a system that computerizes the process of maintaining records of business transactions, makes the system more efficient, and at the same time enables more sales. Such a system could be used by a wholesaler to keep track of sales to distributors, while the distributors could use the system to keep track of sales to their customers.

SUMMARY OF THE INVENTION

The present invention leverages the Internet to computerize and provide a customized distribution network for a wholesale business operation. One embodiment of the invention discloses a method and system for allowing a user to develop a custom distribution network based on market conditions relating to the supply and demand based on various pricing schemes. This system offers a variety of products and associated pricing from its wholesaler's database. The user is able to set various prices for products based on market conditions. The system displays the margin of profitability to the user for each variable price selected.

According to another aspect of the invention, the system generates a user identification number for users of the system, both distributors and customers, which allows the users to gain access to product listings through the Internet. The system of the present invention displays information when requested by the user. The system searches the wholesaler's database to find a product requested by the user. Furthermore, the wholesaler and the distributor can send information through this system via the Internet to its customers, such as weekly specials, billing information, product listings that are available for purchase and any other type of information that needs to be communicated to the users of the system.

The present invention allows a wholesaler to host a web site, which can be tailored by the wholesaler's distributors for each customer of each distributor. In so doing, each distributor can quickly and efficiently communicate and update product information and pricing for each of the distributor's customers. Since distributors are typically not web developers, this system allows distributors to set up and maintain a web site easily and quickly.

The present system further includes a method for developing a custom distribution network by providing a master database of product information to distributors and customers. Both distributors and customers can add or delete products to and from their order sheets. The distributor can create variable pricing for the products sold to customers. The variable pricing is calculated by adding the distributor's chosen variable margin amount to the price paid to the wholesaler for the product. This system allows the wholesaler and the distributor to change prices when necessary to adjust to market conditions. This system creates an efficient process and enables users to generate more sales and thereby an increase in revenues.

BRIEF DESCRIPTION OF THE DRAWINGS

FIGS. 11A–11J provides screen shots of various embodiments of the present invention.

DETAILED DESCRIPTION

Figure 1:
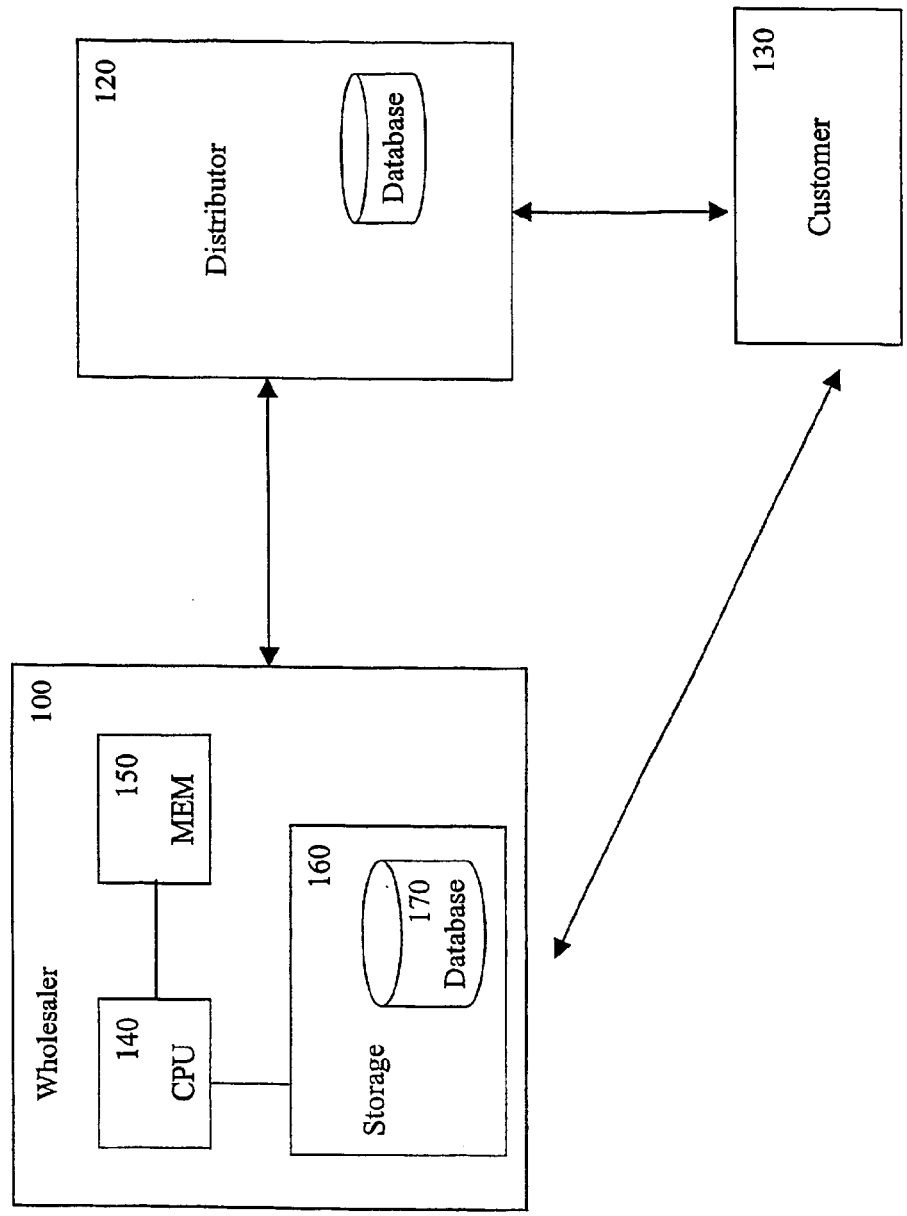
FIG. 1 is a block diagram illustrating the system of the present invention.

The present invention provides a method and system to implement a custom distribution network based on market conditions. This is done by using a database of consumer products from which a distributor can select products for sale to customers. Variable pricing can be set and used in calculating prices for customers.

A distributor purchases products from a wholesaler and then sells these products to its customers. This system allows the distributor to select products from a list of products that are available from a wholesaler. The distributor pays the wholesaler for the products. According to the invention, the distributor can adjust the price that he charges for these products. The difference between the price the distributor has paid and the price that is received from his customers is known as the margin, which determines the profit or loss incurred on the sale of the product. The price is adjusted by applying a variable amount of money, at the distributor's discretion, to the price the distributor has paid for the product. The distributor adjusts prices in an effort to either gain or keep a customer. For example, some customers are charged more for a product while other customers may be charged less for the same product because the distributor wants to attract their business and is willing to incur a lower profit or loss. The distributor may also like to adjust the prices charged during the course of a business relationship with customers. This system allows the distributor to set up pricing at his discretion. The distributor is able to track inventory, customers, and the variable prices that are being charged to each customer. This system enables the distributor to update product inventory and to use variable pricing for a competitive advantage.

A web site is provided for each distributor that uses this system. This web site displays information about the distributor and may include any special product prices being offered by the distributor to its customers. This system assigns a user identification number to each of the distributor's customers, which will then enable the customers to access the distributor's web site to view product listings and prices.

According to one embodiment, the distributor may generate variable pricing on specially priced products and on the retail-priced product inventory by entering the variable margin amounts. In this system the variable margin amounts are associated with customer categories. A customer category is based on a variable margin amount, which was previously entered by the distributor, or the distributor may use a listed default margin amount to be associated with a customer category. The system will use the customer categories when listing the price of products for a customer and when billing customers for those products. Through the use of this system, the distributor can adjust pricing for each delivery cycle by creating the variable pricing and associating the variable pricing with customer categories.

Users are able to download a database of information for use in determining variable pricing and in deciding the types of products to offer on a daily basis. The users may store the information on their personal computers and access the information when off-line. The information may be used to locate customer information, product and pricing information and to offer products to potential new customers. Due to the built-in flexibility of this system, this custom distribution network will create an efficient and useful product for its users.

With reference to the figures, various embodiments of the present invention will now be described in greater detail. FIG. 1 illustrates an overview of one embodiment of the system of the present invention. The wholesaler's server 100 interacts with one or more distributors 120 and one or more customers 130. The wholesaler's server includes a central processing unit (CPU) 140, a memory unit 150, and storage unit 160. It should be noted that the wholesaler's server is not limited in form, and may be a network of computers, a distributed system, a mainframe computer, a web site and other related computer system implementations. Many different configurations of a wholesaler server are contemplated as being within the spirit of the present invention.

The wholesaler's server stores a product database 170 in the storage unit. The database contains information relating to products and prices. This database is kept up to date with frequent updates of data therein. The wholesaler manages accounts payable information as well as sending outstanding invoices, weekly specials and product information to the customers. This information may be sent to the customers via United States mail and facsimile or by electronic mail.

The wholesaler's server, the distributor and the customer are all connected through a network. Access to this network is not limited to any one choice of communication means. Accordingly, it is possible to use a modem, digital subscriber line (DSL), Integrated Services Digital Network (ISDN) line, a cable modem and electronic data link, fiber optical connection, wireless data connection, Internet Protocol (IP) or any other connection that can be used for data transfer over the Internet or an Intranet to access the network. The wholesaler's server is protected by various means for computer security, such as providing a firewall in the wholesaler's server. It should be noted that various security measures are contemplated within the scope of the present invention to ensure the contents of the wholesaler's server are fully secured.

Figure 2:
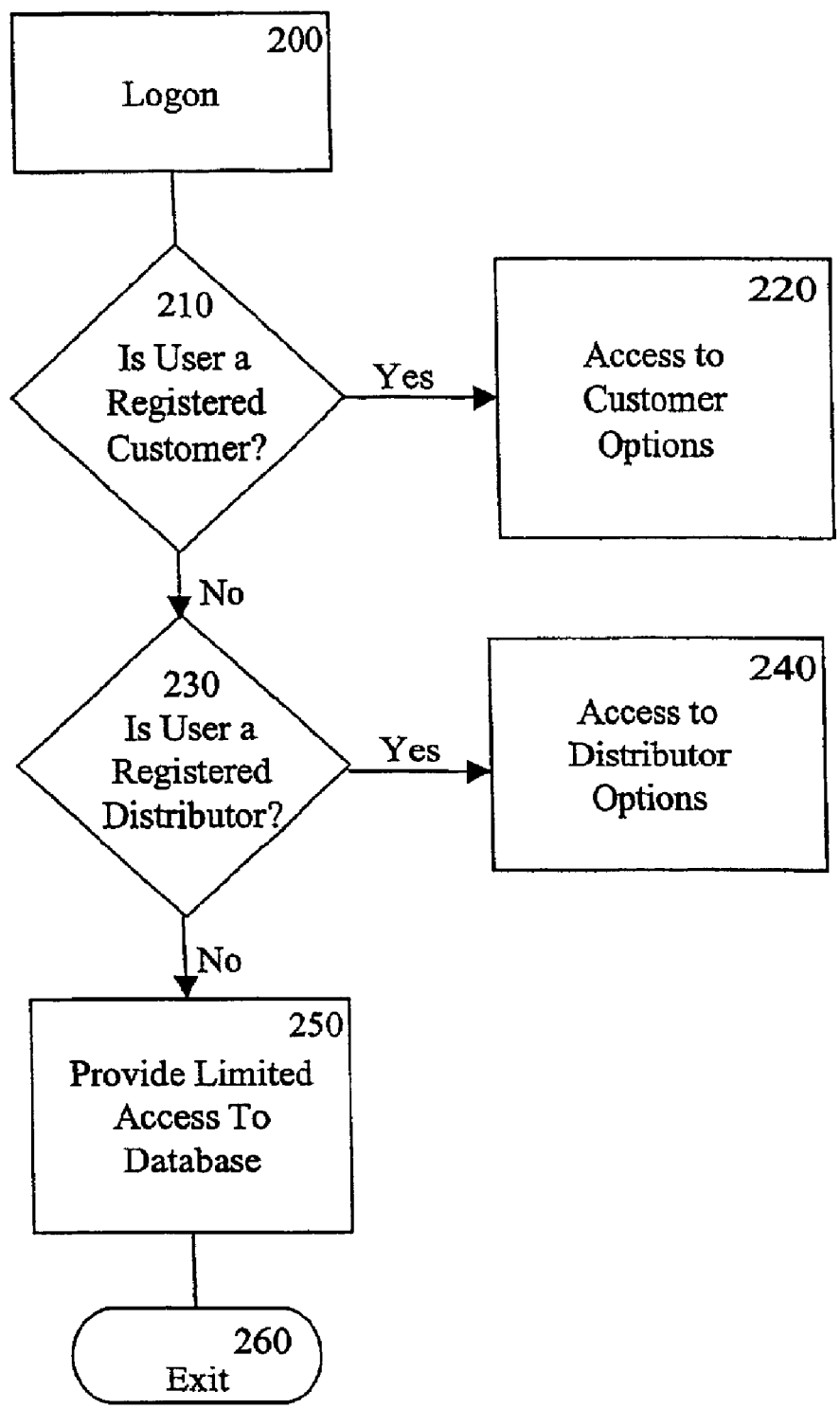
FIG. 2 depicts a flow diagram of the logon routine.

FIG. 2 illustrates the process of logging onto the system of the present invention by a customer, distributor or a potential customer. Initially, at step 200, the user enters the system by logging in with a user identification number or other identifying information. It should be noted that the type of identifying information entered does not limit the scope of the present invention. Accordingly, various forms of identification may be used for access into the system of the present invention. Depending on the type of user, the system directs the user to the appropriate sections in the system. In step 210, the system checks to determine whether the user is a customer. If the user is a customer, the system will provide access to customer options, as shown in step 220. However, if the system determines that the user is not a customer, then the system further checks to determine if the user is a distributor, as shown in step 230. If the user is a distributor, then the system provides access to the distributor options, as in step 240. If the system determines that the user is neither a customer nor a distributor, limited access will be allowed into the system, as shown in step 250. It should be noted that once access is granted, the system directs the user to various access options depending on the functionality of the system.

Figure 3:
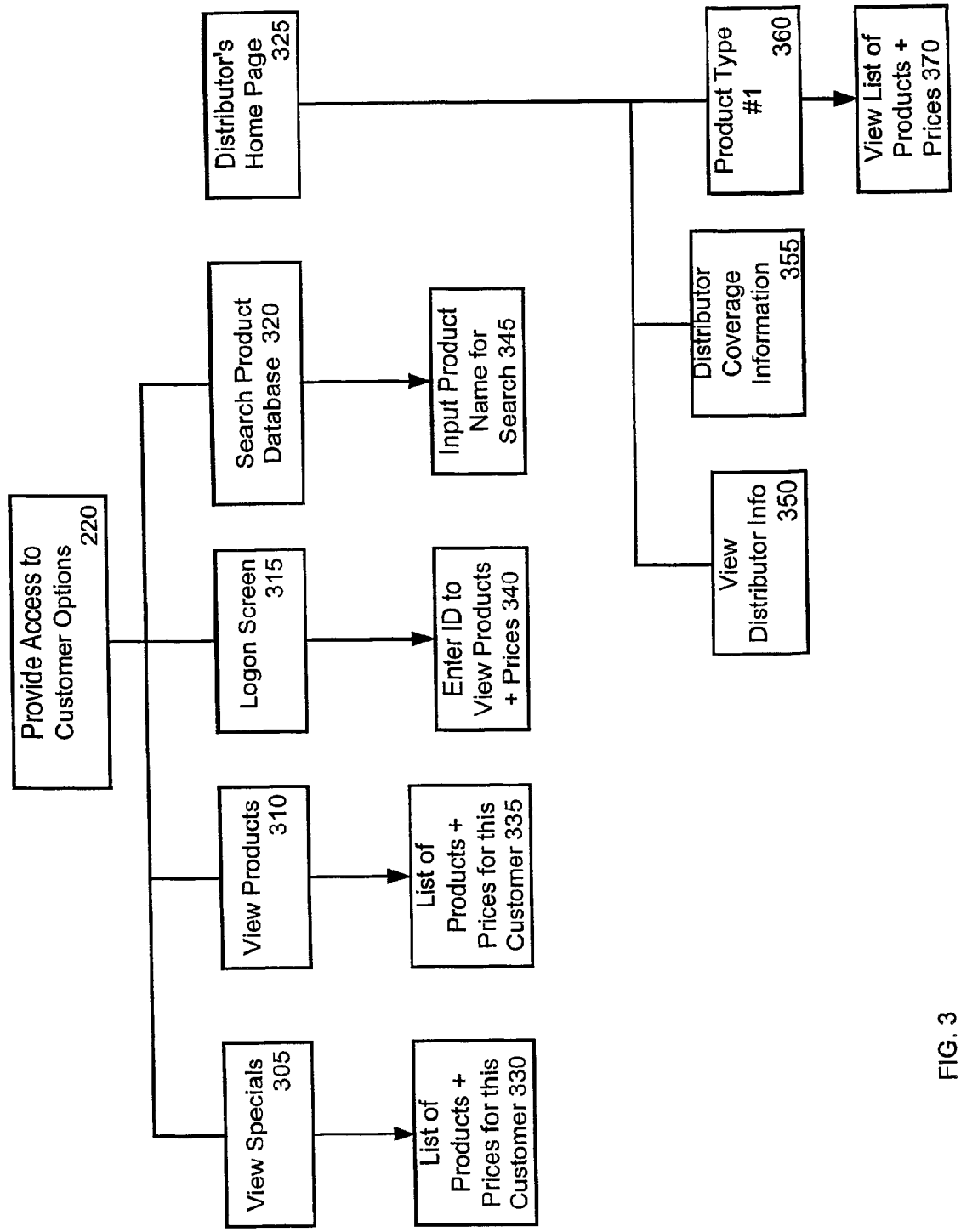
FIG. 3 depicts a flow diagram of the routine for a providing access to customer options.

FIG. 3 illustrates the options that are available to the customer upon valid entry into the system. The options available to the customer include the ability to view the specially priced products, the specials, at step 305 and the ability to view other available products, at step 310. Upon viewing the specials, a list of specially priced products is displayed for the customer, as shown in box 330. The list may include the products and prices. The customer is able to view the other available products by accessing a list of these products and prices, as shown in box 335.

The customer is provided a logon screen, as shown in box 315. When accessing the logon screen the customer may enter another identification number, in step 340, to access information relating to that particular customer account. The customer may have access to various other accounts, if that customer is in charge of several other accounts/locations that receive products from the distributor. These accounts can then be reviewed for informational purposes.

At step 320, the customer is able to search for products listed in the distributor's product database. This search can be accomplished by entering a product name, in step 345, and having the system search the database. It should be noted that a search of the wholesaler's database is not to be limited to any one type of inquiry and that various types of searches may be performed.

The customer is provided the ability to access the distributor's home page, in step 325. When accessing the distributor's home page, the customer can view distributor information, in step 350, and view the distributor's coverage information, as in step 355. The distributor may provide various types of information for viewing on the home page.

In addition to accessing the general information relating to the distributor, the customer may also access product listings from the distributor's home page, in step 360. When the customer accesses the distributor's product listings, a list of products and prices will be displayed in step 370. This system may be expanded or narrowed to display as many types of products the distributor wishes to display.

Figure 4:
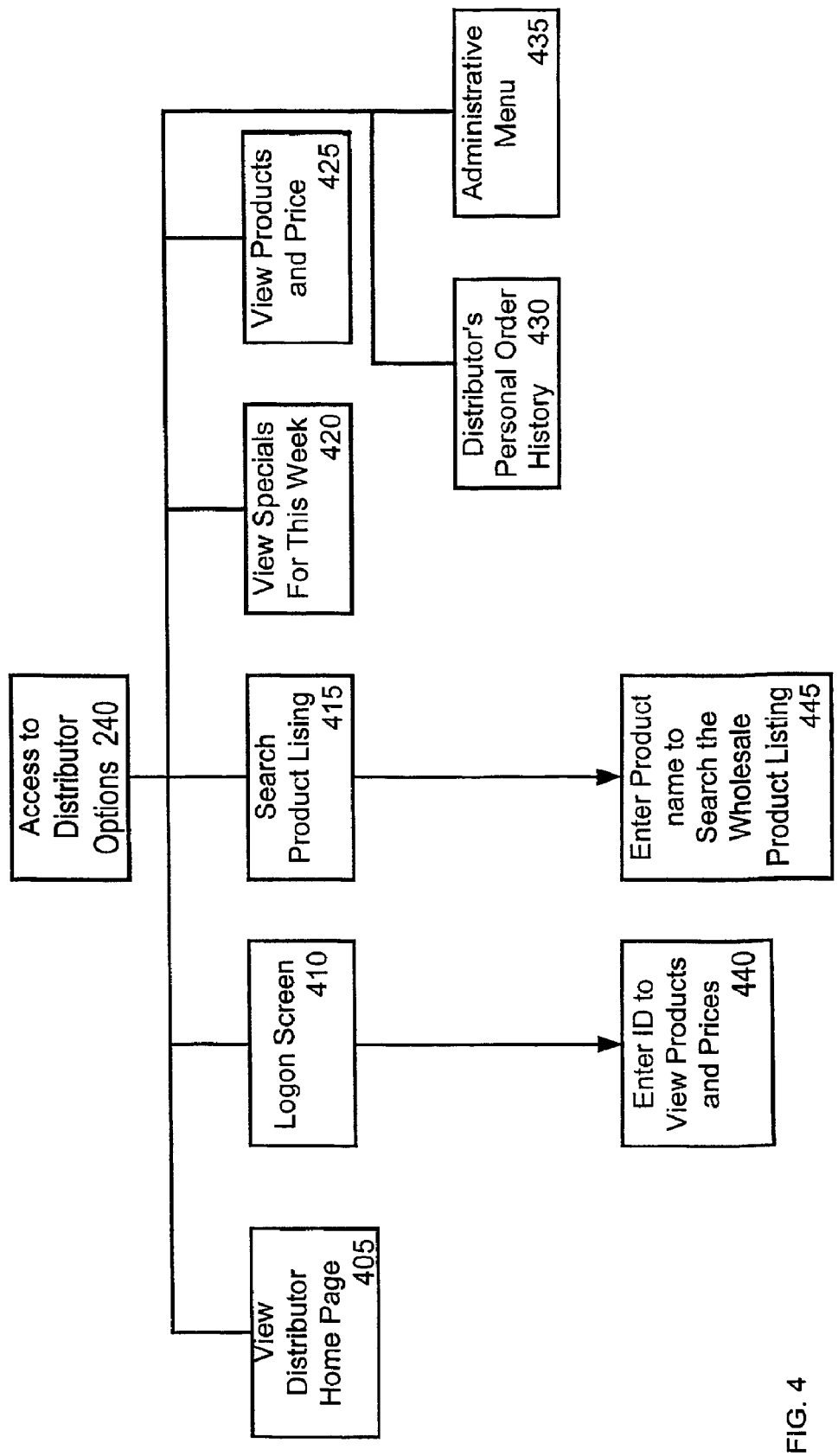
FIG. 4 depicts a flow diagram of the routine for a providing access to distributor options.

FIG. 4 illustrates the options that are available to the distributor upon valid entry into the system. In step 405, the distributor has access to a personalized home page. The distributor may send any necessary changes for the home page to the wholesaler's server 100, which will be discussed in more detail below. The wholesaler creates and maintains the distributor's web site. Because distributors are not web site developers and/or do not have the time necessary to devote to developing a web site, the creation and maintenance of the distributor's web site is a benefit for the distributor, which allows the distributor more time to dedicate to customer needs. The distributor may contribute information such as product listings and margin amounts that are used by the wholesaler in determining the customer's product prices for display on the web site. In the alternative, certain information, such as product listings, may be provided by the wholesaler. The customer is granted access to the distributor's web site via a log-on password, which is created by the wholesaler, after receipt of information establishing the customer as a customer of the distributor. What the customer ultimately sees on the site may be particularly targeted for that customer including product and price information.

In step 410, the distributor can access a logon screen to enter a user identification number. This user identification number is associated with a customer's account. The distributor has access to all the accounts belonging to customers and may review the information associated with each account, as shown in step 440. The distributor also has access to the wholesaler's product listing, as shown in step 415. A product name may be entered as the search parameter, as shown in step 445, or the distributor may browse the product listing to determine if a particular product is available.

The distributor may view the specially priced products for the week, in step 420, and view other products and prices, in step 425. These options display the associated wholesaler products and price information that is available to the distributor for purchase. The wholesaler offers specially priced products, the specials, and retail-priced products to the distributor, who may in turn offer those products at a special price to its customers. The wholesaler's product lists can be expanded or narrowed depending on the wholesaler's product availability.

The distributor has access to a personal order history screen that can be viewed or updated, in step 430. The distributor's personal order history will display information that provides details regarding the products and pricing of the distributor's past purchases. At this step, the distributor may add or delete products on its order sheet. The distributor also has access to an administrative menu, as in step 435, which is described in more detail below.

Figure 5:
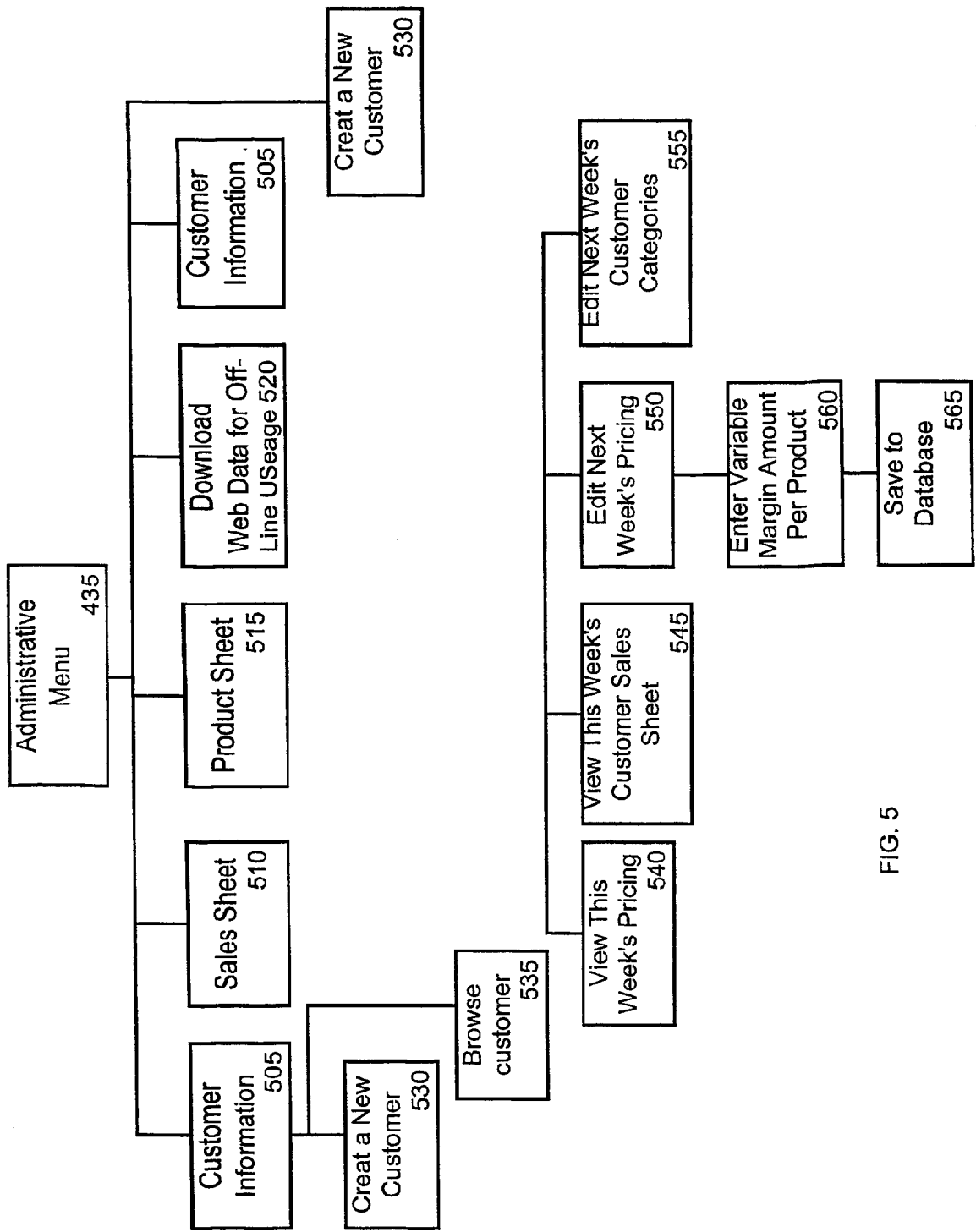
FIG. 5 depicts a flow diagram of the routine that processes the Administrative Menu option for a distributor.

As shown in FIG. 5, the distributor's Administrative Menu is the main option that enables the customization of products and prices for the distributor's customers. The distributor has access to customer information, as shown in step 505, where the distributor can create a new customer entry 530 and browse the current customer listing in 535. The customer entry details information specific for each of the distributor's customers. The system adds the customer information to the wholesaler and distributor databases and associates that customer with the distributor. When the distributor views the customer listing, all customers associated with that distributor will be displayed.

The distributor has access to a sales sheet, as shown in step 510, which enables the administration of products that are specially priced. When accessing the sales sheet option, the distributor can view the present week's pricing, 540, which contains the distributor's retail-priced products that are available to his customers for the week's current period. The distributor can also view the present week's customer sales sheet, 545, which lists the sales prices for each of his customers for the current week. Though the present discussion mentions prices for a week's time period, it is possible to adjust prices for any time period that is appropriate.

The distributor can edit the pricing for his customers for a future time period, as shown in step 550. As noted above, the pricing may be changed on a weekly basis or any length of time desired by the user. To edit the pricing for a future time period, the distributor must enter variable margin amounts per product, in step 560. The distributor can generate variable margin amounts for each product by entering three different amounts in the margin groups. A variable margin amount is added to the distributor's base price, which then creates the price that the distributor will charge his customer for a particular product. Both the base price and the newly created variable price are stored in the wholesaler and distributor databases. The distributor also has the option to select the default margin amount to add to the base price to generate the variable price amount. The default margin amount is generated by the salesforce price less the wholesaler's price. The salesforce price for a particular product is a price that is produced by determining the average of the prices paid by all distributors in the network for that particular product. For example, if it is determined that the salesforce price of a product is $3.00 and the wholesaler's price to the distributor is $2.75, then the default margin amount is $0.25. To create a variable price, the distributor has the option to choose a variable margin amount from one of the three different amounts that were entered in the margin section for a particular product or the default margin, which is $0.25 in this example. For example, if the distributor decides that he would like to make ten cents ($0.10) on the sale of a particular product, $0.10 should be entered as one of the variable margin amounts. The other variable margin amounts may be $0.15 and $0.20. This system automatically associates the variable margin amounts with customer categories. Therefore, $0.10 may be associated with Category A, $0.15 may be associated with Category B and $0.20 may be associated with Category C. The distributor can edit the customer categories, as shown in step 555. By editing a customer category, the distributor is able to choose a different variable margin amount to apply to the base price of a product thereby using the variable pricing aspect of this system. This is discussed in more detail below in FIG. 6.

After the distributor has entered the variable margin amounts for the products they are saved to the wholesaler's and the distributor's databases, as shown in step 565.

Under the Administrative Menu step the distributor can download web data for off-line usage, in step 520, and can upload a file for the distributor's web site, as shown in step 525. For example, when the distributor is at a customer's location, the downloaded data can be accessed to provide information to any current or potential customers regarding products and prices. The distributor can upload data, which may be a file with changes, additions or deletions for the distributor's web site. The distributor's web site is created by the wholesaler however the distributor has the ability to update the web site through this option.

Another embodiment of the present invention supports the customization of a "branded" web site, which allows a distributor to display products under the distributor's brand name. This branded web site has its own color scheme and is accessible though a domain name, which is separate and distinct from the wholesaler's domain name. The wholesaler maintains his ability to access the branded web site in order to send direct mailings, facsimiles and product information to the distributor's customers. A brand name distributor may collaborate with the wholesaler to use the variable pricing options that this invention enables. Variable pricing is established by a process similar to the process used on a distributor's web site that is not 'branded', which is discussed below. Through the use of a branded web site this system can invoke additional variable pricing modules, which may adjust the variable pricing based on a percentage value per product or product category rather than only using variable margin amounts as entered by the distributor.

The distributor can manage accounts payable information in step 528. This option enables the distributor to keep track of billing and payment information. Products and associated prices are listed. This option may be expanded to meet both the distributor and wholesaler accounts payable needs.

Figure 6:
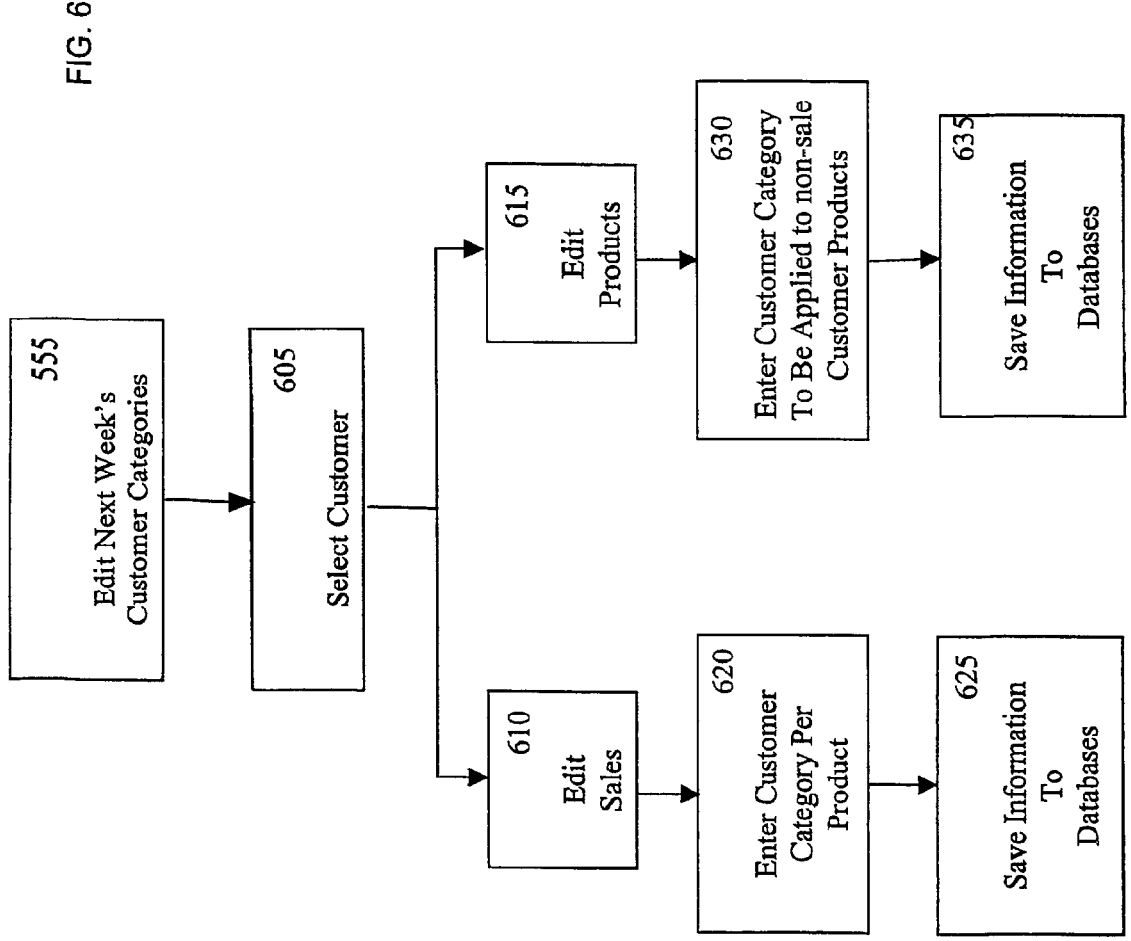
FIG. 6 depicts a flow diagram of the routine that edits weekly customer categories.

FIG. 6 illustrates the process for editing the customer categories for a future time period. Again, these categories can be edited for any time period necessary. FIG. 6 shows how the variable margin amounts, which were previously entered by the distributor, are applied to each of the customer's products in the form of a customer category. As noted above, the customer category is based upon the variable price margins. First, the distributor must select the customer whose product prices he wishes to update, as shown in step 605. The distributor can then edit the customer category for the products that are specially priced, 610, and edit the customer category for the other retail-priced products, 615. To edit the customer category for the products that are specially priced, the distributor must enter the customer category per product, as shown in step 620. The customer category has already been associated with a variable margin amount, or the default margin amount, as shown above in step 560. As in the above example, $0.10 was associated with Category A, therefore the distributor enters an "A" in the category column for the product that he wishes to add the $0.10. By doing this, the distributor applies the variable margin amount in customer category A to the price of that particular product. For example, if the distributor paid $3.00 for a product and uses customer category A as the variable margin amount to calculate the price to charge a customer, then the distributor is charging a total of $3.10, which is $3.00, the base price, plus $0.10, the chosen variable margin amount. In this case the customer will pay $0.10 more than the distributor paid to the wholesaler for the same product, giving the distributor a margin, or profit, of $0.10.

In this example, the system will use the price that is determined by adding the amount in category A to the distributor's base price, to list the price of that product for the customer and to bill the customer for that product. The customer categories are saved in the wholesaler's and the distributor's databases, as in step 625. To edit the pricing on other customer products, that are retail-priced, the distributor must enter a customer category, which will apply the variable margin amount that were previously set up in that category by the distributor, to the other, retail-priced, customer products, as in step 630. The difference between editing the products that are specially priced and editing the other retail-priced products is that the distributor will enter variable margin amounts based on product price ranges for the retail-priced products versus entering variable margin amounts based on each product individually for the specially priced products. A product price range refers to products that are in a particular price range such as products priced within the $1.01 to $1.50 range. The variable margin amounts are then used to determine which price category the distributor will base his prices for each customer. After the distributor selects the appropriate customer category to be applied to the products, the choices are then saved to the wholesaler's and the distributor's databases, as shown in step 635.

Figure 7:
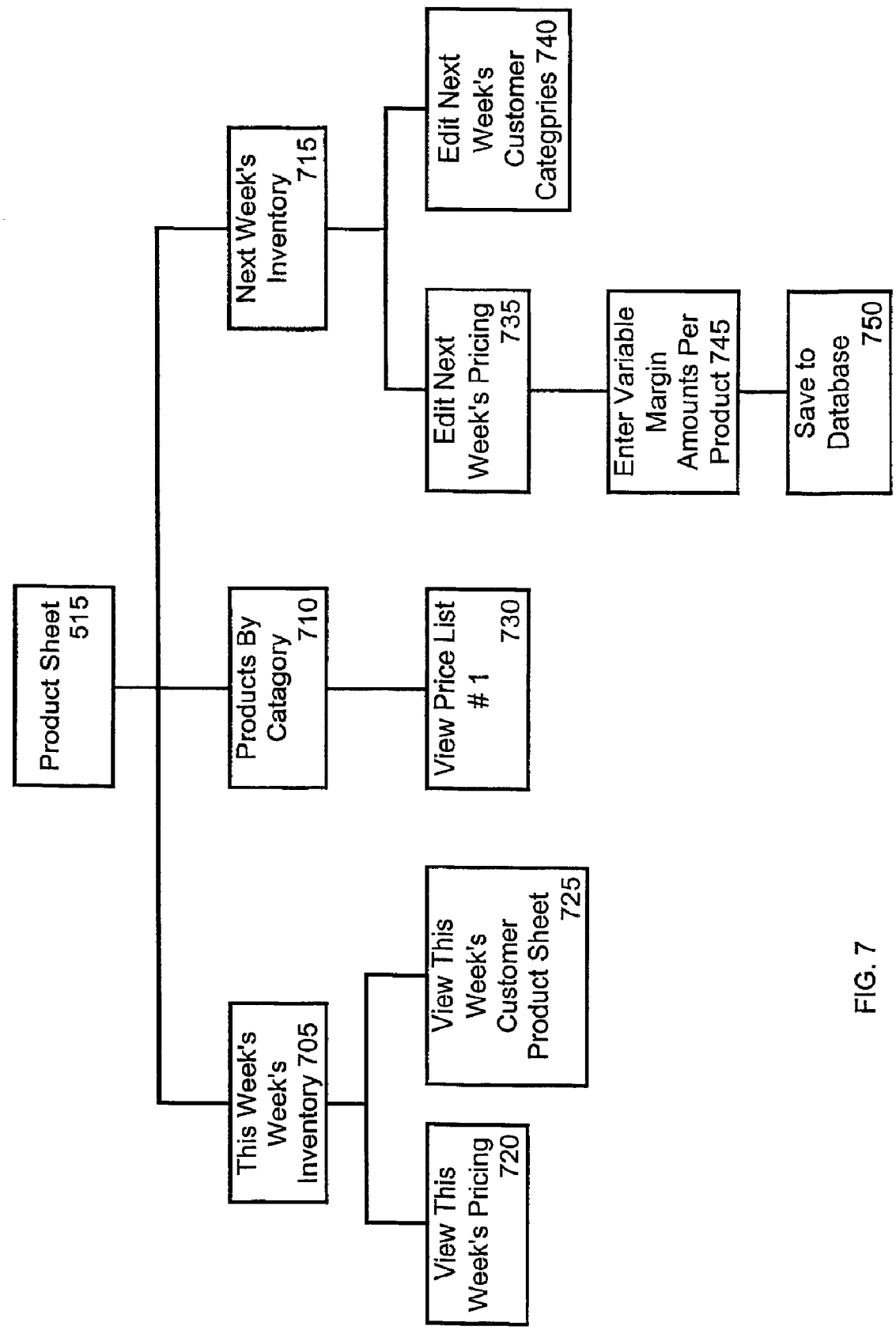
FIG. 7 depicts a flow diagram of the routine that processes the distributor's access to a product sheet.

FIG. 7 illustrates the distributor's options when dealing with the administration of wholesale products that are not specially priced. As shown in step 515, the distributor has the ability to view this week's inventory 705, view products by category 710, and view next week's inventory 715. When viewing weekly inventory 705 the distributor can view the current week's pricing, in step 720. For each product price range this step displays the current default margin amounts and the variable margin amounts as associated with customer categories. The distributor can also view the current week's pricing for a particular customer and for a particular product type, as in step 725. The distributor must first select which customer account to review. The distributor then has the option to view the sales sheet, which lists the specially priced products and prices, or view a sheet listing a particular type of product. A particular type of product sheet, such as a beef sheet, may list different types of beef products and the associated prices.

When the distributor views the products by category 710, a list of customer products and prices is displayed, as in step 730. These products were previously associated with a particular customer category by the distributor. For example, if the distributor decided to apply category A's variable margin amounts to the prices of a customer's products, the products displayed in this step will reflect the prices that have been calculated by using the margins from category A. The price that is displayed reflects the distributor's base price plus the chosen variable margin amount. To determine what the margin amount is for a particular product, the distributor can use the mouse pointer and place the cursor in the checkbox near the listed price for a product, which then causes the margin amount to be displayed in the lower left hand corner of the screen.

When viewing the inventory for the next week, 715, the distributor may edit next week's pricing, in step 735. The process to edit next week's pricing is the same as the process described in step 550, as part of the distributor's sales sheet option. To create variable pricing the distributor enters the variable margin amounts for each product, as shown in step 745. These margin amounts are then saved to a database, as shown in step 750. Also, when viewing the inventory for the next week 715, the distributor can edit next week's customer categories, in step 740.

Figure 8:
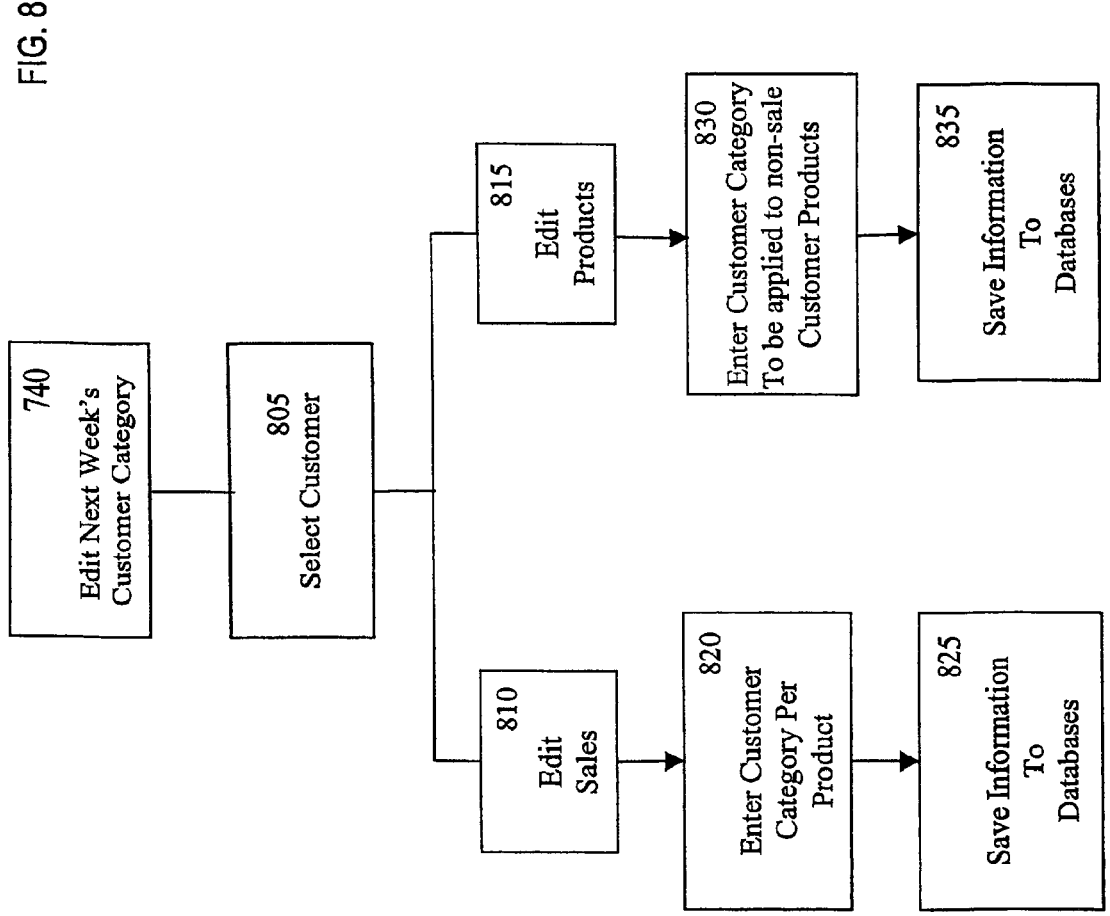
FIG. 8 depicts a flow diagram of the routine that edits weekly customer categories.

FIG. 8 illustrates the process of updating the customer categories for the next week's time period. This process is similar to the process described in step 555, as part of the distributor's sales sheet option. The distributor must first select the customer, as in step 805. The distributor may then edit the customer category for the products that are specially priced, in step 810, and edit the customer category for other, retail-priced, products, as in step 815. To edit the customer category for sales products, the process is similar to the process followed in step 620. The distributor will enter a customer category per product, as in step 820, which will associate the price in that category with the product. The category information is then saved to the wholesaler's and the distributor's databases, as in step 825.

When the distributor wants to edit the customer categories on the other retail-priced customer products, the process is similar to the process followed in step 630. The distributor must enter the customer category, as in step 830. This will apply the variable margin amounts that were previously set up in that customer category by the distributor, to the other customer products. This information is then saved to the wholesaler's and the distributor's databases, as shown in step 835.

Figure 9:
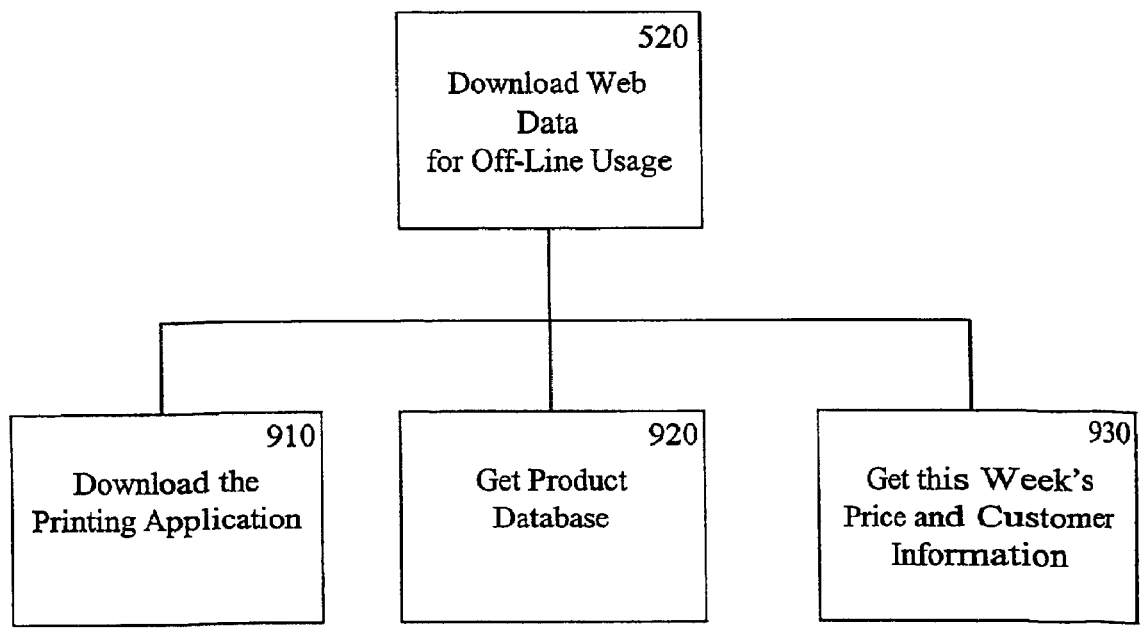
FIG. 9 depicts a flow diagram of the routine that downloads information from the product database.

As part of the distributor's administration options, the distributor has the ability to download and upload information to and from the wholesaler's server. FIG. 9 illustrates the types of information that the distributor can download from the wholesaler database. Items such as a printing application 910, the product database 920, and this week's price and customer information 930 can be retrieved from the wholesaler's database. The printing application allows the distributor to print out the customer's specially priced products and other products at a local printer, possibly a customer's printer, or to send the information by facsimile to the customer. The product database and this week's price and customer information can be downloaded to a local file for use at a later time.

Figure 10:
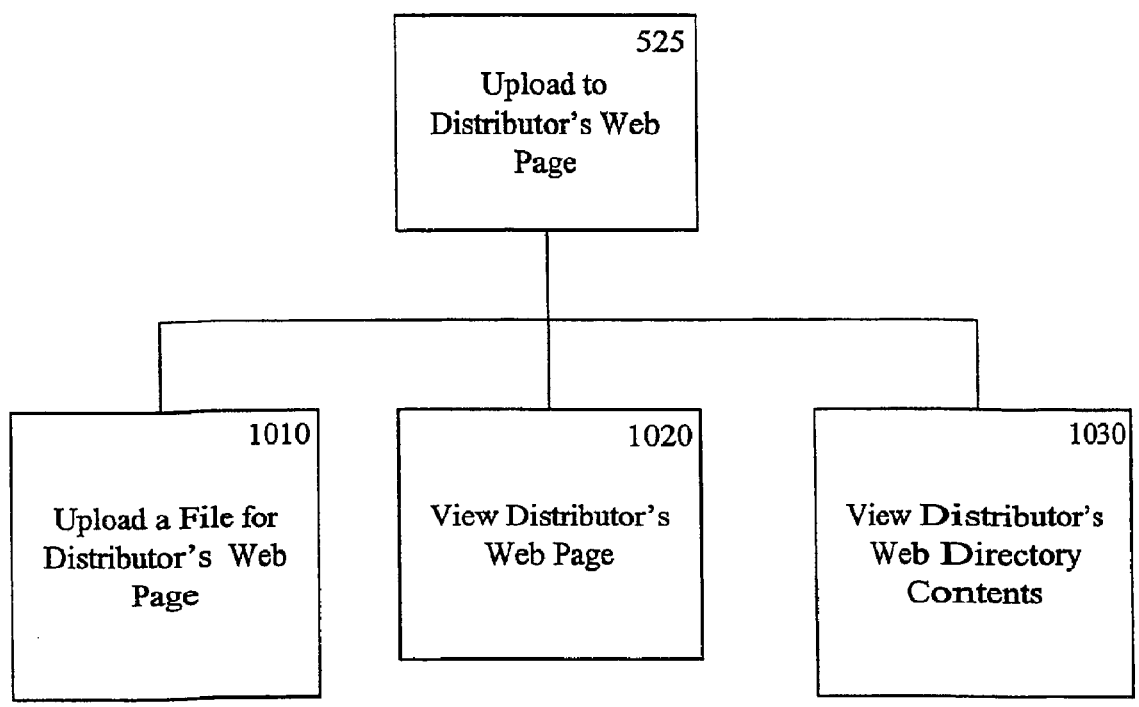
FIG. 10 depicts a flow diagram of the routine that uploads information to the product database.

FIG. 10 illustrates the types of information that the distributor can upload to the wholesaler's server. The distributor can upload a file for his web site, as in step 1010, view the web site, as in step 1020, and view the web directory contents, as in step 1030. As stated earlier, the distributor can upload any product changes, additions or deletions and price adjustments that are necessary. By uploading this file, the distributor can change the products and/or prices that will be displayed as part of his web site information. The distributor may access his web site for accuracy and view the data that is being used to display this information. The distributor's web site will be accessible by both the distributor and the distributor's customers under the wholesaler's domain name through the use of a log-on password established by the wholesaler.

The attached FIGS. 11A through 11J provide screen shots of one embodiment of the present invention. FIG. 11A provides a screen shot of the Distributor Admin Menu 1100. As stated earlier, this is the main option that enables the distributor to conform products and variable pricing to the distributor's customers. The underlined words and phrases are web links that enable the distributor to navigate to other screens within this system. The distributor's name, Distributor #1 1103, is listed with the distributor's address 1105 at the top of the Distributor Admin Menu 1100. The Rollover Status 1107 is displayed, which provides the date and time of the latest update to the wholesaler's database. The distributor has access to a Customer Information section 1109 where a new customer entry can be created or existing customer lists can be browsed. The Sales Sheet 1111 and the Beef Sheet 1113 sections provide access to the pricing and customer category options that are the means for customizing the distribution network through the creation and use of variable pricing for the distributor's products. The Sales Sheet 1111 and Beef Sheet 1113 sections will be addressed in more detail in the following paragraphs. The distributor has the ability to download information 1115, such as product names and prices, from this screen and the ability to upload 1117 a file containing data for the distributor's web site.

FIG. 11B shows the screen that allows the distributor to view the current week's pricing adjustments, which can be viewed by accessing "View This Weeks Pricing" 1120 in the Sales Sheet 1111 section of the Distributor Admin Menu 1100. This screen displays the product name 1121, the salesforce price 1122 and four variable margin amounts per product which are labeled as the Default Margin 1123, the A Margin 1124, the B Margin 1125 and the C Margin 1126. The distributor will later select one of these variable margin amounts for use in determining the price to charge a customer for the listed product.

FIGS. 11C1 and 11C2 show a sales sheet for a customer listed as Customer #1 1131, which is obtained by accessing the "View This Weeks Customer Sales Sheet" 1130 option in the Sales Sheet 1111 section of the Distributor Admin Menu 1100, selecting a customer and then selecting the customer's sales sheet. The sales sheet lists the specials for Customer #1 1131 for the time period of Oct. 30, 2000 to Nov. 3, 2000 1133, and includes the products and prices that the distributor is offering to Customer #1 1131. The distributor can obtain more information about the listed product price by moving the cursor or pointer to the square 1132 displayed after the price. This action causes information to display on the screen, which may contain the margin amount for a particular product, the customer category associated with the product and whether or not the price is a sales price. For example, the information may appear as follows: ($0.20)—A—SALE: True, which means that the margin on this product is $0.20, the customer category is A, and the price is a sales price.

FIGS. 11D1 and 11D2 show a screen that must be accessed by the distributor to adjust the margin amounts per product on the sales sheet and can be obtained by accessing the "Edit Next Weeks Pricing" 1140 option in the Sales Sheet section 1111 of the Distributor Admin Menu 1100. This screen displays the product name 1141, salesforce price 1142, and the default margin 1143. The distributor is able to enter different amounts in the A 1144, B 1145 and C Margin 1146 fields. These different amounts are used to generate the variable price for a product, which the distributor accomplishes by selecting one of the margin amounts to add to the base price of a product, as shown in FIGS. 11E1 and 11E2. After the amounts have been entered or edited, the "Accept Information" button 1147 may be selected to save the data to the wholesalers database and the distributors database.

FIGS. 11E1 and 11E2 show the customer category for each product on the sales sheet that will be used for the following week. The distributor may edit the customer category. This screen is obtained by accessing the "Edit Next Weeks Customer Categories" 1150 in the Sales Sheet section 1111 of the Distributor Admin Menu 1100, selecting a customer, and then selecting the "Edit Sales" option. This screen lists the product names 1151, salesforce prices 1152, the default margin amounts 1153, and the three different price margins 1154, 1155, 1156. The distributor can edit the customer category column 1157 to enter or change the category for each product. The customer category can be either A, B, C or D, which associates the amounts in the A 1154, B 1155, C 1156 or Default margin 1153 columns respectively with the base price for that product. Once the distributor has completed entering or editing the customer category column the "Accept Information" button 1147 may be selected, which saves the data to the wholesaler's and the distributor's databases.

FIG. 11F shows a list of margin amounts for each product price range 1181. This list is obtained by accessing the "View This Weeks Pricing" 1160 in the Beef Sheet section 1113 of the Distributor Admin Menu 1100. These product price ranges are for beef products within the listed price range 1181. The listed margin amounts; A 1185, B 1186, C 1187, and the Default Margin 1183, are the amounts that are currently being used to determine the variable pricing for the beef products priced within the listed product price range for a customer.

FIG. 11G displays the distributor's beef prices for a customer listed as Customer #1. This screen is obtained by accessing the "View This Weeks Customer Beef Sheet" 1170 in the Beef Sheet section 1113 of the Distributor Admin Menu 1100, selecting a customer and then selecting the "Beef Sheet" option. Beef product names 1172 and associated pricing 1179 for the date of Oct. 31, 2000 1173, are displayed. Again, the distributor can access more information about the price by moving the cursor or pointer to the square box 1175 following the price listed for each product, which causes the margin amount that is being used to determine the price for that product to be displayed. For example, the distributor may see "($0.12)" in the lower left hand corner of the screen when placing the cursor on the square box following the price of $1.96 for Choice Eye Round. The $0.12 represents the margin amount that is used in determining the price for Choice Eye Round.

FIG. 11H is similar in format to FIG. 11G. In FIG. 11H the prices displayed are based on the margin amount associated with a particular customer category 1178 instead of being based on the prices as selected for a particular customer as in FIG. 11G. This screen shot displays beef products 1172 and their respective prices 1179, which are associated with the margin amounts in Customer Category B 1178. This screen is obtained by selecting "B" 1173 under "By Category" 1171 in the Beef Sheet 1113 section of the Distributor Admin Menu 1100. All of the prices listed use the margin amounts previously associated with customer category B 1178 in determining the price for each beef product. Again, the distributor may view the margin amount associated with each price 1179 by moving the cursor or pointer to the square box 1175 following each price, which will result in the display of that amount on the screen.

FIG. 11I shows a screen that enables the distributor to adjust the margin amounts associated with each product price range. This screen is obtained by selecting "Edit Next Weeks Pricing" 1180 in the Beef Sheet 1113 section of the Distributor's Admin Menu 1100. The product price range 1181 and the default margins 1183 are listed for beef products. The distributor may enter up to three different amounts 1185, 1186, 1187, which will represent margin amounts, in the fields provided for each product price range. As stated on the sheet, the distributor may enter a "-1" in any of the fields to automatically use the listed default margin for that particular product price range. When the distributor has completed entering or editing the margin amounts, the "Accept Information" button 1147 may be selected to save the data to the wholesaler's and the distributor's databases.

FIG. 11J depicts the screen where the distributor can adjust the customer category that is used in determining the prices for the products in the listed product price ranges 1191. This screen is obtained by selecting "Edit Next Weeks Customer Category" 1190 in the Beef Sheet 1113 section of the Distributor Admin Menu 1100. In this screen the distributor may enter either customer category A 1193, B 1194, C 1195, or D for the default margin 1192, to apply the associated margin amount in that customer category when calculating the price for all products priced within the listed price ranges 1191. Once the desired category has been entered the "Accept" button 1147 may be selected in order to save the distributor's category choice to the wholesaler's and distributor's databases.

It will be understood that the method and system of the present invention has many applications, and that the present invention is not limited to the representative examples disclosed herein. Moreover, the scope of the present invention covers conventionally known variations and modifications to the system components and the method steps described herein.

What is claimed is:

1. A method for using a computer to distribute and price a product by a distributor, comprising:
   accessing on a computer system a customer account for a customer;
   determining a variable margin amount for said customer for said product, wherein said variable margin amount is associated with said customer, the variable margin amount is also capable of being associated with a distributor designated customer category;
   transmitting via a computer system said variable margin amount to a wholesaler to create and distribute an order sheet customized for said customer; and
   receiving and saving a copy of the customized order sheet in a distributor's database, wherein said customized order sheet includes a wholesaler determined variable product price calculated from the variable margin amount.

2. The method of claim 1, wherein said transmitting said variable margin amount comprises:
   transmitting numerical values in variable margin amount fields to the wholesaler to be associated with said product or a product price range; and
   uploading said numerical values to a wholesaler database and a distributor database.

3. The method of claim 1, wherein said product is a specially priced product.

4. The method of claim 1, wherein said product is a retail-priced product.

5. The method of claim 1, wherein said product and associated variable product price may be downloaded for off-line usage.

6. The method of claim 1, wherein said distributor's database provides a listing of customized order sheets associated with at least one additional customer.

7. A system for using a computer to distribute and price a product by a distributor, comprising:
   a memory unit,
   a processing unit disposed in communication with said memory unit,
   said processing unit configured to:
      access a customer account for a customer;
      determine a variable margin amount for said customer for said product, wherein said variable margin amount is associated with said customer, said variable margin amount is also capable of being associated with a distributor designated customer category;

transmit variable margin amount to a wholesaler to create and distribute an order sheet customized for said customer; and receive and save a copy of the customized order sheet in a distributor's database, wherein said customized order sheet includes a wholesaler determined variable product price calculated from the variable margin amount.

8. A system for using a computer to distribute and price a product by a distributor, comprising:

means for accessing a customer account for a customer;

means for determining a variable margin amount for said customer for said product, wherein said variable margin amount is associated with said customer, the variable margin amount is also capable of being associated with a distributor designated customer category;

means for transmitting variable margin amount to a wholesaler to create and distribute an order sheet customized for said customer; and means for receiving and saving a copy of the customized order sheet in a distributor's database, wherein said customized order sheet includes a wholesaler determined variable product price calculated from the variable margin amount.

9. A computer device comprising a computer readable medium having computer readable code means embodied therein for pricing a product by a distributor, said computer readable code means further comprising:

means for accessing a customer account for a customer;

means for determining a variable margin amount for said customer for said product, wherein said variable margin amount is associated with said customer, the variable margin amount is also capable of being associated with a distributor designated customer category;

means for transmitting said variable margin amount to a wholesaler to create and distribute an order sheet customized for said customer; and means for receiving and saving a copy of the customized order sheet in a distributor's database, wherein said customized order sheet includes a wholesaler determined variable product price calculated from the variable margin amount.

10. A method of implementing a variable product price distribution system, comprising:

receiving on a computer system a current wholesale product price from a wholesaler;

calculating on a computer system a variable margin amount for a customer;

transmitting to the wholesaler said variable margin amount for creating a customized product price based on the current wholesale product price and the variable margin amount; and transmitting to the wholesaler an indication designating said variable margin amount as a default for at least one additional customer in a customer category.

11. The method of claim 10, wherein the customer category is a distributor defined group of customers.

12. The method of claim 10, wherein the product price corresponds to a product from a distributor's sales sheet.

* * * * *